United States Patent [19]

Fox et al.

[11] E Re. 29,887

[45] Reissued Jan. 23, 1979

[54] BOX OR PACKET FOR CIGARETTES

[75] Inventors: Austin L. Fox; William A. A. Jones, both of London, England

[73] Assignee: Molins Limited, London, England

[21] Appl. No.: 769,814

[22] Filed: Feb. 17, 1977

Related U.S. Patent Documents

Reissue of:

[64] Patent No.: 3,874,581
Issued: Apr. 1, 1975
Appl. No.: 372,367
Filed: Jun. 21, 1973

[30] Foreign Application Priority Data

Jun. 30, 1972 [GB] United Kingdom ..... 30629/72

[51] Int. Cl.[2] ..... B65D 5/66
[52] U.S. Cl. ..... 229/44 CB
[58] Field of Search ..... 229/44 R, 44 CB, 37 R

[56] References Cited

U.S. PATENT DOCUMENTS

| | | | |
|---|---|---|---|
| 2,396,150 | 3/1946 | Bonville | 229/44 CB |
| 2,975,890 | 3/1961 | Block | 229/44 CB |
| 2,992,766 | 7/1961 | Guyer | 229/44 CB |
| 3,327,888 | 6/1967 | Chalmers et al. | 229/44 CB X |
| 3,608,812 | 9/1971 | Hamilton | 229/37 R |
| 3,979,047 | 9/1976 | Focke et al. | 229/44 CB |

FOREIGN PATENT DOCUMENTS

| | | | |
|---|---|---|---|
| 654558 | 12/1962 | Canada | 229/44 CB |
| 2161065 | 6/1973 | Fed. Rep. of Germany | 229/44 CB |
| 819204 | 9/1959 | United Kingdom | 229/44 CB |
| 819205 | 9/1959 | United Kingdom | 229/44 CB |
| 819206 | 9/1959 | United Kingdom | 229/44 CB |

*Primary Examiner*—Leonard D. Christian
*Attorney, Agent, or Firm*—John C. Smith, Jr.

[57] ABSTRACT

A hinged lid packet for cigarettes has an integral inner frame consisting of an inwardly recessed panel extending from the front wall. A pair of side flaps extends perpendicularly from the sides of the recessed panel, and the lower portions of the side flaps are partly sandwiched between the inner and outer flaps which form the side walls of the packet.

18 Claims, 3 Drawing Figures

BOX OR PACKET FOR CIGARETTES

Matter enclosed in heavy brackets [ ] appears in the original patent but forms no part of this reissue specification; matter printed in italics indicates the additions made by reissue.

This invention relates to packets, for example for cigarettes or the like, and is particularly concerned with packets known as hinged lid packets.

Hinged lid packets are conventionally made from two cardboard blanks, one blank for forming the body and lid which are joined by an integral hinge, and another blank for forming an insert or inner frame which is assembled to the inside of the front and side walls of the body and projects above these walls. The insert forms a seal between the lid and body when the packet is closed and, more importantly, it retains the packet closed by frictionally engaging the inside of the front wall of the lid. However unless the insert is made substantially of the full depth of the packet, which would consume an unnecessary amount of cardboard, it is difficult to secure the insert to the body at the correct height to achieve a satisfactory engagement with the lid. A further disadvantage is that additional machinery is required for making a separate blank for the insert, and for assembling the insert in the body of the packet.

Proposals have been made to produce a packet having an insert integral with, and made from the same blank as, the body and lid.

According to the present invention there is provided a hinged lid packet with a lid portion hinged to a body portion, the body portion comprising a front wall, a rear wall, a pair of side walls each formed by an inner flap extending from the rear wall and by an outer flap extending from the front wall, a recessed panel extending upwardly from the front wall, the panel being narrower than the front wall and being deformed inwardly parallel thereto so that when the packet is closed the panel lies wholly within the lid portion, and a pair of side flaps extending from the sides of the panel, each side flap being partly sandwiched between the inner and outer flaps of the side walls.

The inner flap may be higher than the outer flap, the top portion of the inner flap being deformed inwardly parallel to its bottom portion so that the side flaps are sandwiched substantially in alignment with said bottom position of the inner flaps. The sandwiched parts of the side flaps are preferably secured to the inner and outer flaps by adhesive.

The invention will now be described, by way of example, with reference to the accompanying drawings in which.

Figure 1:
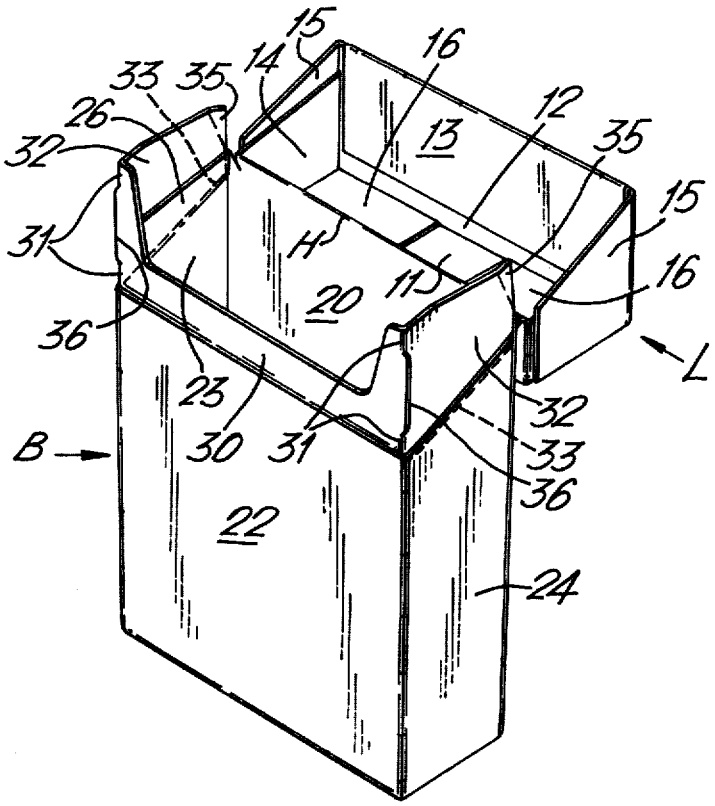
FIG. 1 is a perspective view which shows a packet according to the invention.
Figure 2:
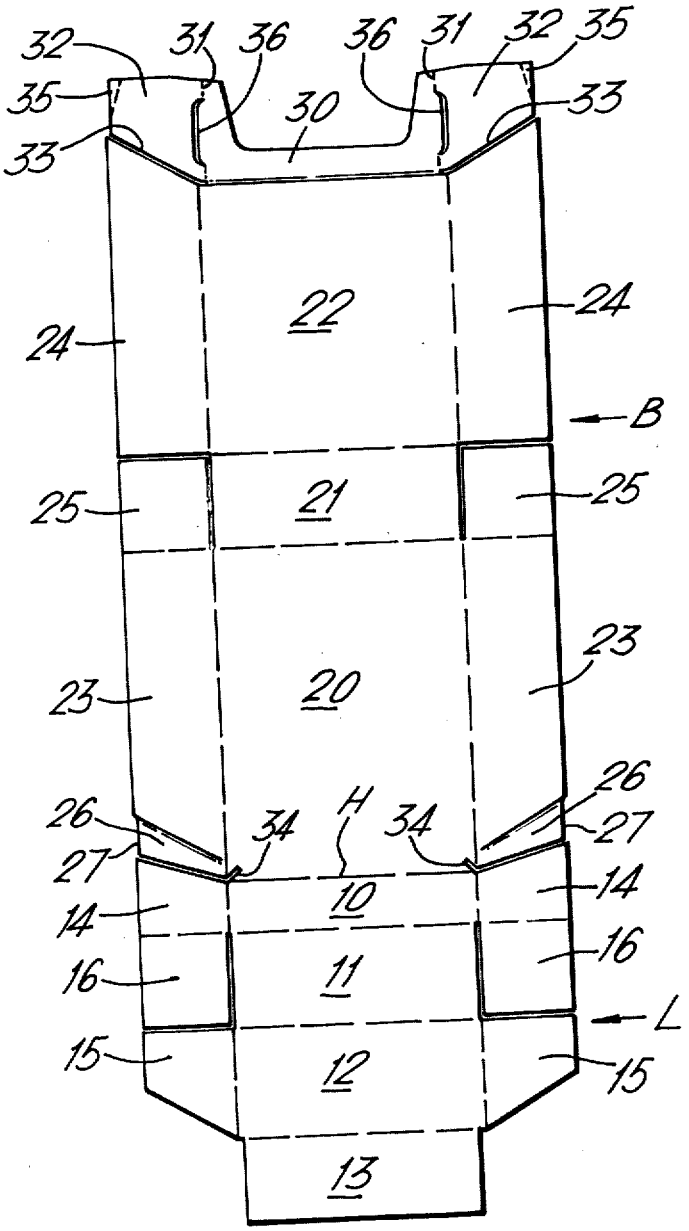
FIG. 2 is a plan view, to a smaller scale, of the blank from which the packet is made.
Figure 3:
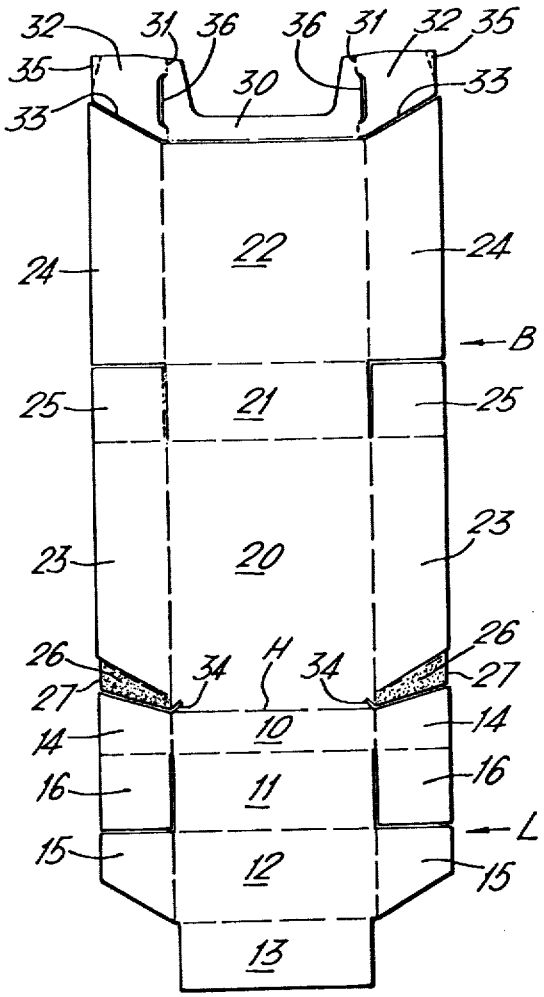
*FIG. 3 is a view similar to FIG. 2 showing adhesive applied to the deformed top portions.*

The packet shown in FIG. 1 is produced from the single cardboard blank shown in FIG. 2 and comprises a lid L integrally hinged along a line H to a body B.

The lid L includes a rear wall 10 extending from the hinged line H, a top panel 11, a front wall 12, and a reinforcing panel 13 which is folded back and secured by adhesive to the inside surface of the front wall 12.

Inner and outer flaps 14 and 15 extend from each side of rear wall 10 and the front wall 12 respectively, and are secured together to form the side walls of the lid. A further flap 16 extends from each of the flaps 14 and is secured inside the top panel 11.

The body B comprises a rear wall 20, a base 21, and a front wall 22. The side walls of the body are formed by inner flaps 23 extending from each side of the rear wall 20 and by outer flaps 24 extending from each side of the front wall 22. A flap 25 extending from each inner flap 23 is secured to the inside of the base 21. The top portion 26 of each inner flap 23, as viewed in the upright packet of FIG. 1, is deformed inwardly parallel to the bottom portion by an amount corresponding to the thickness of the cardboard blank. Small cut-outs 27 are provided at the outer edges of the deformed portions 26.

A recessed panel 30 extends upwards from the front wall 22, and is likewise deformed inwardly parallel to the wall 22 by the thickness of the blank. The width of the recessed panel 30, defined by lines 31, is smaller than that of the front wall 22 and is shown slightly exaggerated in the drawings.

Joined to each side of panel 30 along corner 31 is a side flap 32, which is approximately of the same width as the inner and outer flaps 23 and 24. As a result of the recessing of panel 30 and the inclination of the lower edges 33 of the flap 32, the lower edges 33 come below the upper edges of the outer flaps 24 in the erect packet.

The insides of the lower edges rest against the deformed portions 26 so that the flaps 32 are in alignment with the bottom portions of inner flaps 23. Thus the flaps 32 are partly sandwich between the upper portions of the inner and outer flaps 23 and 24 to which they are secured by adhesive. The cut-outs 27 serve to accommodate the inside corners of the recessed panel 30 at the lower ends of the lines 31.

By having the recessed panel 30 integral with the body, the corners above the lines 31 (which serve to engage the inside of the front wall of the lid to keep the packet closed) can be produced more accurately to the correct height.

Certain other features shown in FIGS. 1 and 2 are conventional and will therefore only be described briefly.

Short inclined slits 34 are provided at the ends of the hinge line H, to facilitate opening of the lid L; the corners 35 of the flaps 32 are inwardly bent to guide the sides 14 and 15 over the flaps 32 when closing the lid L; and ears 36 are formed at the corner edges 31 to frictionally engage the sides of the lid and thus assist in maintaining the packet closed.

The shape of the cut-out in the recessed panel 30 is also conventional, and provides access to cigarettes (not shown) which are contained in the packet.

It will be understood that the reinforcing panel 13 need not be rectangular, but may instead be shaped to coincide with the cut-out in the panel 30, so that less material is wasted in the production of the blanks.

We claim:

1. A hinged lid packet with a lid portion hinged to a body portion, the body portion comprising a front wall including an integral recessed panel extending upwardly from the front wall, a rear wall, a pair of side walls each formed by an inner flap and by an outer flap, one of said flaps extending from the rear wall and the other of said flaps extending from the front wall, the recessed panel [being narrower than the front wall and] being recessed towards the interior of the packet and disposed substantially parallel to said front wall so that when the packet is closed the panel lies wholly within the lid portion, and a pair of side flaps extending from the sides of the recessed panel in a direction parallel to the respective side walls, the lower part of each side flap being sandwiched between the inner and outer flaps of the respective side walls.

2. A hinged lid packet as claimed in claim 1 in which the inner flaps are higher than the outer flaps, and in which the top portion of each inner flap is recessed inwardly parallel to its bottom portion so that the side flaps are sandwiched substantially in alignment with said bottom portion of the inner flaps.

3. A hinged lid packet as claimed in claim 1 in which the lower sandwiched parts of the side flaps are secured to the inner and outer flaps by adhesive.

4. A one-piece blank for forming a hinged lid packet as claimed in claim [1] 2.

5. A hinged lid packet as claimed in claim 1 in which the upper edges of the side walls are inclined so that the height of the side walls is greater at the rear wall than at the front wall.

6. A hinged lid packet as claimed in claim 1 wherein at least said body portion is constructed from a one-piece blank.

7. A hinged lid packet with a lid portion hinged to a body portion, the body portion comprising a front wall; a rear wall; a pair of side walls each formed by an inner flap extending from the rear wall and by an outer flap extending from the front wall; a recessed panel extending upwardly from the front wall, the panel being narrower than the front wall and being recessed inwardly parallel thereto so that when the packet is closed the panel lies wholly within the lid portion; and a pair of side flaps extending from the sides of the panel, each side flap being partly sandwiched between the inner and outer flaps of the side walls, the inner flaps being higher than the outer flaps, and the top portion of each inner flap being deformed inwardly parallel to its bottom portion so that the side flaps are sandwiched substantially in alignment with said bottom portion of the inner flaps.

*8. A hinged lid packet with a lid portion hinged to a body portion, said body portion comprising a front wall; a rear wall; a pair of side walls each formed by a front flap extending from said front wall and by a rear flap extending from said rear wall, each rear flap having a top portion so shaped relative to said front flap that said top portion projects above the respective front flap; and integral recessed panel extending upwardly from said front wall, said panel being recessed inwardly parallel thereto by at least the thickness of the material of said packet; a pair of side flaps extending from the sides of said panel, each side flap extending in a direction parallel to the respective front and rear flaps; and means securing each side flap to at least said top portion of the respective rear flap.*

*9. A hinged lid packet as claimed in claim 8 in which said recessed panel is narrower than said front wall.*

*10. A hinged lid packet with a lid portion hinged to a body portion, said body portion comprising a front wall with an integral panel extending upwardly from said front wall, said panel being recessed inwardly parallel to said front wall by at least the thickness of the material of said packet; a rear wall, a pair of side walls each formed by a front flap extending from said front wall and by a rear flap extending from said rear wall, each rear flap having a top portion so shaped relative to said front flap that said top portion projects above the respective front flap; and a pair of side flaps extending from the sides of said recessed panel, each side flap extending in a direction parallel to the respective side walls, the lower part of each side flap being secured to at least said top portion of the respective rear flap.*

*11. A hinged lid packet as claimed in claim 10 in which said inner flaps are higher than said outer flaps, and in which the top portion of each inner flap is recessed inwardly parallel to its bottom portion so that said side flaps are substantially in alignment with said bottom portion of said inner flaps.*

*12. A hinged lid packet as claimed in claim 10 in which the lower parts of said side flaps are secured to said inner and outer flaps by adhesive.*

*13. A one-piece blank for forming a hinged lid packet as claimed in claim 10.*

*14. A hinged lid packet as claimed in claim 10 in which the upper edges of said side walls are inclined so that the height of said side walls is greater at said rear wall than at said front wall.*

*15. A hinged lid packet with a lid portion hinged to a body portion, said body portion comprising a front wall; a rear wall; a pair of side walls each formed by an inner flap and by an outer flap, one of said flaps extending from said rear wall and the other of said flaps extending from said front wall, said inner flaps being higher than said outer flaps; a recessed panel extending upwardly from said front wall, the panel being recessed inwardly parallel thereto so that when the packet is closed the panel lies wholly within said lid portion; a pair of side flaps extending from the sides of said panel, each side flap extending in a direction parallel to the respective inner and outer flaps of said side walls; and means securing each side flap to the respective inner flap; the top portion of each inner flap being recessed inwardly parallel to said bottom portion so that each of said side flaps is substantially in alignment with the bottom portion of the respective inner flap.*

*16. A one-piece blank for forming a hinged lid packet having a lid portion hinged to a body portion, said body portion comprising a front wall with an integral recessed panel extending upwardly therefrom, a base connected to said front wall, a rear wall connected to said base, a front flap extending from each side of said front wall, a rear flap extending from each side of said rear wall and having a top portion so shaped relative to said front flap that when the rear and front flaps are brought into contact for securement together each said top portion of said rear flap projects above the respective front flap; and a side flap extending from each side of said recessed panel and arranged in the erect packet to be secured to at least said top portion of said rear flap.*

*17. A hinged lid packet with a lid portion hinged to a bottom portion, said body portion comprising a front wall; a rear wall; a pair of side walls each formed by an inner flap and by an outer flap, one of said flaps extending from said rear wall and the other of said flaps extending from said front wall and one of said flaps having a top portion so shaped relative to the other flap that said top portion projects above the other flap; a recessed panel extending upwardly from said front wall, the panel being recessed inwardly parallel thereto so that when the packet is closed the panel lies wholly within said lid portion; a pair of side flaps extending from the sides of said panel, each side flap extending in a direction parallel to the respective inner and outer flaps of said side wall; and means securing each side flap to at least said top portion of said one flap.*

*18. A hinged lid packet with a lid portion hinged to a body portion, said body portion comprising a front wall*

*with an integral panel extending upwardly from said front wall, said panel being recessed inwardly parallel to said front wall by at least the thickness of the material of said packet; a rear wall; a pair of side walls each formed by an inner flap and by an outer flap, one of said flaps extending from said rear wall and the other of said flaps extending from said front wall and one of said flaps having a top*

*portion so shaped relative to the other flap that said top portion projects above the other flap; and a pair of side flaps extending from the sides of said recessed panel, each side flap extending in a direction parallel to the respective side walls, the lower part of each side flap being secured to at least said top portion of said one flap.*

* * * * *